Feb. 11, 1941.                     C. LYNN                     2,231,675
                 VENTILATION OF DIRECT-CURRENT MACHINES
                        Filed Sept. 28, 1937
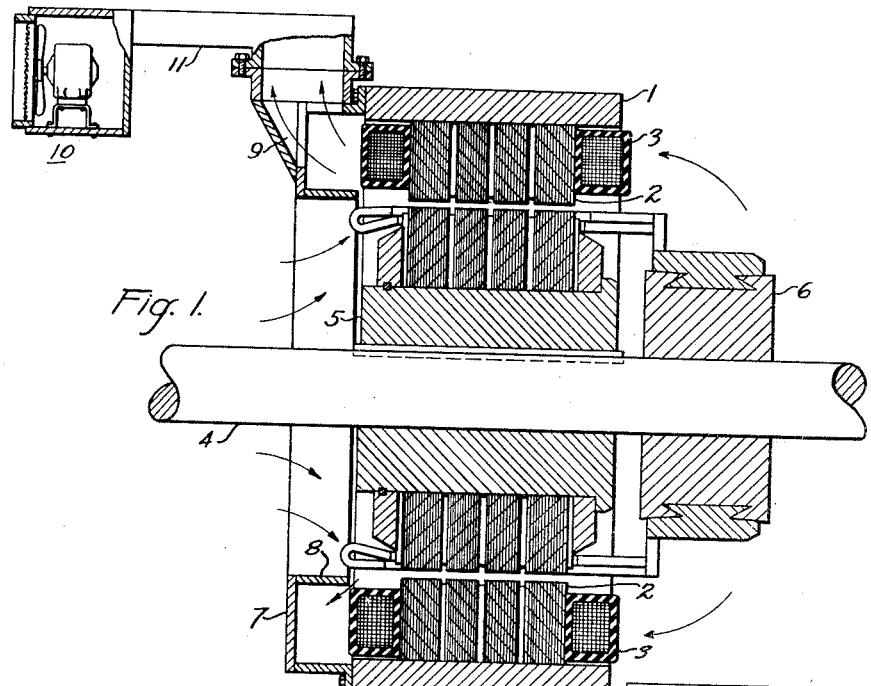
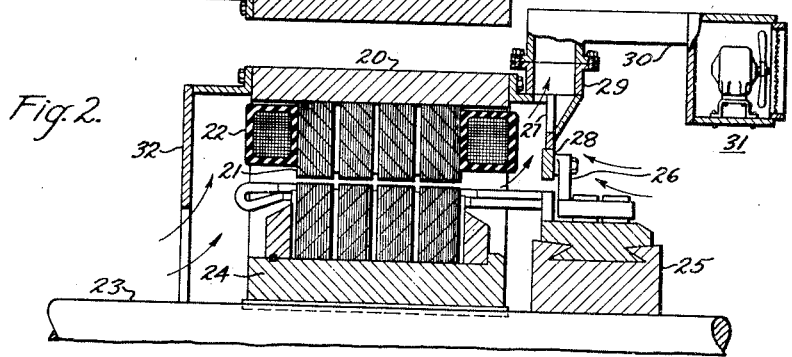
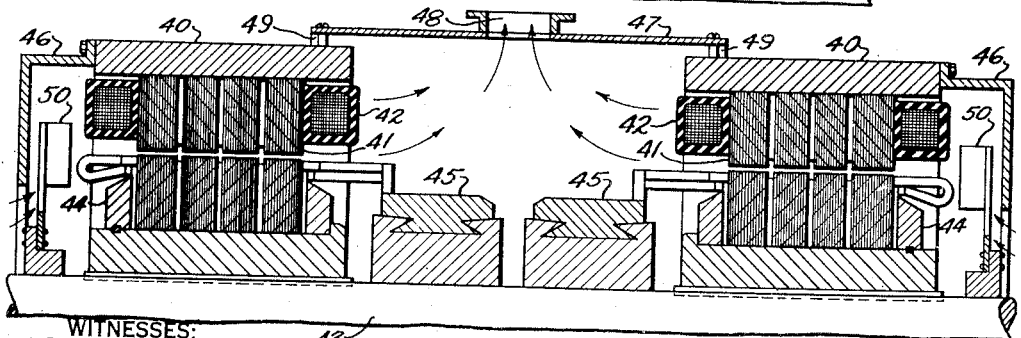
WITNESSES:                                           INVENTOR
                                                  Clarence Lynn.
                                               BY
                                                     ATTORNEY Patented Feb. 11, 1941

2,231,675

UNITED STATES PATENT OFFICE 2,231,675

VENTILATION OF DIRECT-CURRENT MACHINES

Clarence Lynn, Wilkinsburg, Pa., assignor to Westinghouse Electric & Manufacturing Company, East Pittsburgh, Pa., a corporation of Pennsylvania Application September 28, 1937, Serial No. 166,103

1 Claim. (Cl. 171—252)

This invention relates to the ventilation and cooling of direct-current dynamo-electric machines and may be applied to either generators or motors.

The ventilation of direct-current machines is of great importance, since the rating of the machine is largely determined by its temperature rise, and improved cooling will, therefore, result in a greater output from a given machine. It is also of considerable importance in many cases to keep the motor room as cool as possible, especially in the case of large-sized motor rooms such as are found in modern steel mills where many thousand kilowatts of generating capacity or many thousand horsepower of motors may be installed in one room. This has been done by totally enclosing the machines in housings which prevent the escape of heated air into the room and providing external fans and circulating systems to pass cooling air through the machines. This arrangement is successful in keeping the motor room cool but has the serious disadvantage that the machines are closed up and access for inspection and maintenance is provided for only by doors and hand holes in the housing which makes servicing of the machines very difficult.

It is, therefore, the object of the present invention to provide a ventilating system for direct-current machines which will improve the cooling of the machines and will also prevent the discharge of heated air into the room, while avoiding the disadvantages of a totally enclosed machine. In carrying out the present invention, an end bell is provided on the machine and is formed with a central opening to permit the entrance of air. The function of this end bell is to direct the air into and through the machine and prevent the discharge of heated air into the room where it may be recirculated through the machine. For the purpose of removing the heated air, an external suction fan is provided and is connected by a suitable duct to an enclosed or partially enclosed part of the machine, which may be the end bell itself. With this arrangement, the heated air is removed in essentially the same manner as if the machine were totally enclosed, but at the same time the machine is sufficiently open to permit access for inspection and maintenance, thus avoiding entirely the principal disadvantage of a totally enclosed machine.

The basic idea underlying this invention may be applied in various embodiments, and three specific examples have been shown in the drawing, in which:

Figure 1 is a longitudinal axial section through a direct-current machine showing the invention as applied to a rear end bell;

Fig. 2 is a similar section, only the upper half of the machine being shown, of the invention as applied to a front end bell; and, Fig. 3 is a similar section through a double-armature direct-current motor showing the invention as applied to a machine of this type.

The machine shown in Figure 1 consists of a stationary frame 1 supporting pole pieces 2 and field windings 3. The shaft is shown at 4 and carries an armature 5 and commutator 6. The rear end bell, indicated generally at 7, is secured to the rear end of the frame, i. e., the end opposite the commutator. This end bell is formed with a central opening of somewhat greater diameter than the armature and is provided with an axial inwardly extending flange 8 which overlaps the armature windings to a substantial distance. A discharge outlet 9 is provided in the end bell and is adapted to be connected to an external suction fan 10 by a suitable duct 11.

Air enters at the rear of the machine through the end bell and passes around through the armature core and windings into the end bell and is withdrawn through the outlet 9 by the action of the suction fan. The inwardly extending flange 8 prevents air from being drawn directly into the end bell and directs all the air into the rear end of the machine through the core and windings so as to produce the maximum cooling effect. It will be apparent that a certain amount of air will also be drawn into the front of the machine, thus cooling the commutator, and that practically all the heated air will be withdrawn through the outlet 9 and discharged outside of the motor room.

The machine shown in Fig. 2 consists of a frame 20 supporting pole pieces 21 and field windings 22. The shaft 23 supports an armature 24 and commutator 25. The brush rigging and brushes are secured to the fixed part of the machine and are indicated at 26. A front end bell 27 is secured to the frame of the machine. This end bell is formed with a central opening of the same diameter as the outer diameter of the rocker ring 28 of the brush rigging, and thus extends from the frame of the machine down to the rocker ring. A discharge outlet 29 is formed in this front end bell, and is connected by a suitable duct 30 to an external suction fan 31. On the rear end of the machine an end bell 32 is provided and secured to the frame of the machine. This end bell is formed with a central opening of less diameter than the armature so as to prevent the discharge of heated air from the rear of the machine. Air is, therefore, drawn in through the rear of the machine, passes through the armature core and windings and collects in the front end bell from which it is withdrawn by the suction fan. A certain amount of air will also be drawn into the front of the machine and have a cooling effect on the commutator and brushes. The construction of the rear end bell is such that it permits the entrance of air into the machine, but prevents heated air which has passed through the armature windings from escaping at the rear end and being recirculated through the machine.

It will be seen that with this construction, practically all the heated air passing through the machine is withdrawn by the suction fan and is not discharged into the room, thus giving the advantage of a totally enclosed machine, but leaving the brush rigging open and permitting free access to it for inspection and maintenance.

This invention may be readily adapted for double-armature motors, or generators, and this arrangement is shown in Fig. 3. The machine shown in this figure consists of two stationary frames 40, each supporting pole pieces 41 and field windings 42. There is a single shaft 43 on which are two armatures 44 and commutators 45, mounted with the commutators toward each other. On the outer ends of the machine are mounted end bells 46 which are similar in construction and function to the rear end bell described in connection with Fig. 2. A cover 47 is provided in the center of the machine and secured to the two frames, thus forming an enclosed space around the commutators. A discharge outlet 48 is formed in this cover and is connected by means of a suitable duct to an external suction fan similar to those shown in Figs. 1 and 2. With this arrangement air is drawn through the end bells at each end of the machine, passes through the armatures and across the commutators and is withdrawn through the outlet 48. It is preferred, as shown on the drawing, to space the cover 47 a slight distance above the frames 40 as shown at 49. By so doing, it is possible to run the machine at a fairly high percentage of rated output with the suction fan stopped, since heated air may escape through the opening thus formed. If desired, fans 50 of any suitable type may be mounted on the shaft 43 to assist in cooling the machine.

In normal operation, practically all of the heated air will be withdrawn through the outlet 48 and very little will escape through the opening 49. If, however, the suction fan is stopped for any reason, it is possible for the machine to operate self-cooled at a fairly high percentage of its rated output, since cool air will be drawn in through the end bells 46, will pass through the cores and windings and escape through the opening 49. When operating in this way, the heated air is discharged into the motor room but this is permissible since it is an emergency operating condition.

While several specific embodiments of the invention have been illustrated and described, it is to be understood that in its broadest aspects, it is not limited to these but includes all equivalent embodiments which fall within the scope of the appended claim.

I claim as my invention:

A dynamo-electric machine having a stator member and a rotor member, the rotor member having windings thereon, a commutator at one end of the rotor member, the machine being open at the commutator end to permit free access to the commutator, an end bell secured to the stator member at the opposite end of the machine, said end bell having a central opening of greater diameter than the rotor member to permit the entrance of air from a room in which the machine is located, baffle means on the end bell for directing the flow of air across the rotor windings and for preventing the escape of heated air into the room, said baffle means comprising a cylindrical flange extending axially into the machine from said central opening and overlapping the rotor windings, means for drawing air into the machine through the end bell and through the open commutator end of the machine, said air flowing through the machine into the interior of the end bell, and means for withdrawing the heated air from the end bell and discharging it outside of the room.

CLARENCE LYNN.